(12) United States Patent
Wang et al.

(10) Patent No.: US 12,465,786 B1
(45) Date of Patent: Nov. 11, 2025

(54) BORON NEUTRON CAPTURE THERAPY (BNCT) SYSTEM COMPRISING A TARGET CURRENT MONITORING DEVICE

(71) Applicant: Huapeng Neutron Technology (Hangzhou) Co., Ltd., Hangzhou (CN)

(72) Inventors: Sheng Wang, Hangzhou (CN); Yaocheng Hu, Hangzhou (CN); Jingjing Fan, Hangzhou (CN); Yupeng Xie, Hangzhou (CN); Haoquan Su, Hangzhou (CN)

(73) Assignee: Huapeng Neutron Technology (Hangzhou) Co., Ltd., Hangzhou (CN)

( * ) Notice: Subject to any disclaimer, the term of this patent is extended or adjusted under 35 U.S.C. 154(b) by 0 days.

(21) Appl. No.: 19/212,763

(22) Filed: May 20, 2025

(30) Foreign Application Priority Data

Jun. 25, 2024 (CN) .......................... 202410822926.2

(51) Int. Cl.
*A61N 5/10* (2006.01)
*H05H 3/00* (2006.01)
*H05H 7/00* (2006.01)

(52) U.S. Cl.
CPC ......... *A61N 5/1048* (2013.01); *A61N 5/1077* (2013.01); *A61N 5/1078* (2013.01); *A61N 5/1079* (2013.01); *H05H 7/001* (2013.01); *A61N 2005/1074* (2013.01); *A61N 2005/1076* (2013.01); *A61N 2005/109* (2013.01); *H05H 3/00* (2013.01); *H05H 2007/008* (2013.01); *H05H 2277/11* (2013.01)

(58) Field of Classification Search
CPC .................... A61N 5/10; A61N 5/1048; A61N 2005/1074; A61N 5/1077; A61N 5/1078; A61N 5/1079; A61N 2005/1087; A61N 2005/109; H05H 3/00; H05H 2007/008
USPC ............................................. 250/398; 378/65
See application file for complete search history.

(56) References Cited

U.S. PATENT DOCUMENTS

| | | | |
|---|---|---|---|
| 9,789,340 B2 * | 10/2017 | Liu | A61N 5/1077 |
| 9,889,320 B2 * | 2/2018 | Liu | A61N 5/1077 |
| 10,082,587 B1 * | 9/2018 | Akabori | G01T 7/00 |
| 10,155,123 B2 * | 12/2018 | Mukawa | A61N 5/1071 |
| 10,157,693 B2 * | 12/2018 | Liu | A61N 5/10 |
| 10,328,286 B2 * | 6/2019 | Liu | A61N 5/1042 |
| 10,343,951 B2 * | 7/2019 | Furuya | A61N 5/10 |

(Continued)

*Primary Examiner* — Allen C. Ho
(74) *Attorney, Agent, or Firm* — Bayramoglu Law Offices LLC

(57) ABSTRACT

A target current monitoring device for a boron neutron capture therapy system includes a beam current shaping body and a replaceable target part disposed inside a proton channel of the beam current shaping body, and further includes an automatic conduction detection device independent of the target part, where the automatic conduction detection device includes a contact part and an external current monitoring apparatus electrically connected with the contact part, the contact part is disposed on a moving path of the target part, and the contact part forms a circuit with the external current monitoring apparatus after being in contact with the target part. Since the automatic conduction detection device and target assembly are independently disposed and no hard-wired connection of electric wires exists, the current of the target can be read in real time under full automation, and the automatic replacement, movement and storage of the target can be achieved.

20 Claims, 9 Drawing Sheets

(56) References Cited

U.S. PATENT DOCUMENTS

| | | | | |
|---|---|---|---|---|
| 10,434,333 B2* | 10/2019 | Liu | ................... | A61N 5/1077 |
| 10,441,815 B2* | 10/2019 | Akabori | ............... | A61N 5/1048 |
| 10,537,750 B2* | 1/2020 | Liu | ................... | A61N 5/1049 |
| 10,568,964 B2* | 2/2020 | Yamaguchi | .......... | A61N 5/1049 |
| 10,639,499 B2* | 5/2020 | Liu | ................... | A61N 5/1078 |
| 10,773,104 B2* | 9/2020 | Liu | ......................... | H05H 3/06 |
| 10,791,618 B2* | 9/2020 | Hsueh Liu | ............... | H05H 3/06 |
| 10,898,731 B2* | 1/2021 | Liu | ................... | A61N 5/1077 |
| 10,898,733 B2* | 1/2021 | Liu | ................... | A61N 5/1081 |
| 10,926,108 B2* | 2/2021 | Liu | ................... | A61N 5/1042 |
| 10,926,110 B2* | 2/2021 | Liu | ......................... | A61N 5/10 |
| 11,058,898 B2* | 7/2021 | Liu | ................... | A61N 5/1064 |
| 11,198,023 B2* | 12/2021 | Chen | ...................... | G21K 5/04 |
| 11,246,209 B2* | 2/2022 | Sasai | ..................... | H05H 7/001 |
| 11,266,859 B2* | 3/2022 | Liu | ......................... | H05H 3/06 |
| 11,338,155 B2* | 5/2022 | Hsiao | ...................... | H05H 3/06 |
| 11,400,316 B2* | 8/2022 | Liu | ......................... | A61N 5/10 |
| 11,458,336 B2* | 10/2022 | Tsai | .................... | A61N 5/1064 |
| 11,545,328 B2* | 1/2023 | Sakai | ........................ | H01J 3/32 |
| 11,559,705 B2* | 1/2023 | Chen | ................. | A61K 41/0095 |
| 11,561,308 B2* | 1/2023 | Liu | ................... | G01N 33/6803 |
| 11,583,701 B2* | 2/2023 | Liu | ................... | A61N 5/1077 |
| 11,740,370 B2* | 8/2023 | Liu | ................... | A61N 5/1077 |
| | | | | 250/391 |
| 11,813,483 B2* | 11/2023 | Liu | ......................... | G21K 5/04 |
| 11,826,583 B2* | 11/2023 | Jiang | ........................ | H05H 3/06 |
| 11,889,612 B2* | 1/2024 | Snitchler | ............... | H05H 7/001 |
| 12,011,615 B2* | 6/2024 | Chen | ........................ | G21K 5/02 |
| 12,023,524 B2* | 7/2024 | Chen | ................... | A61N 5/1078 |
| 12,057,243 B2* | 8/2024 | Vekselman | .......... | A61N 5/1048 |
| 12,238,850 B2* | 2/2025 | Liu | ...................... | C23C 28/345 |
| 12,296,199 B2* | 5/2025 | Jiang | ........................ | E04C 5/07 |
| 12,303,713 B2* | 5/2025 | Kusuoka | ............. | A61N 5/1048 |
| 12,324,934 B2* | 6/2025 | Liu | ...................... | A61N 5/1077 |

* cited by examiner

BORON NEUTRON CAPTURE THERAPY (BNCT) SYSTEM COMPRISING A TARGET CURRENT MONITORING DEVICE

CROSS REFERENCE TO THE RELATED APPLICATIONS

This application is based upon and claims priority to Chinese Patent Application No. 202410822926.2, filed on Jun. 25, 2024, the entire contents of which are incorporated herein by reference.

TECHNICAL FIELD

The present invention relates to the technical field of target current monitoring, and particularly to a target current monitoring device for a boron neutron capture therapy system.

BACKGROUND

In the field of boron neutron capture therapy, generally, an alternating current (AC) current transformer and a direct current (DC) current transformer are mounted at the end of the accelerator to measure the beam intensity, i.e. the current intensity. However, since the AC current transformer and the DC current transformer are generally arranged at a relatively long distance from a neutron source target, there may still be a certain amount of particle loss after the beam passes through the AC current transformer or the DC current transformer. This is reflected on the target as a decrease in the current reaching the target, and the actual beam intensity cannot be obtained through the AC current transformer and the DC current transformer.

Therefore, it is necessary to connect an ammeter through an electric wire at the target to obtain the beam intensity at the target.

However, in addition to the problem that the actual beam intensity of the target cannot be obtained in real time, the method of using an electric wire to connect the ammeter to monitor the target current also has the problem of pulling the ammeter in the automatic target replacement and target storage processes. Moreover, there is a need to manually release the connection between the target and the ammeter in a radiation environment. This not only fails to achieve fully automatic operation, but also poses a radiation risk, and also results in low target replacement efficiency.

Therefore, there is an urgent need to design a device that can be used for measuring the dark current of a target in a comprehensive environment such as boron neutron capture therapy, automatic target replacement and replacement of the moderator to adjust the beam, can read the current of the target in real time under full automation, and at the same time, can achieve automatic replacement, movement and storage of the target, and can achieve free and arbitrary adjustment of the position of the target within a beam shaping body during the replacement of the moderator to meet the needs of various positions.

SUMMARY

The objective of the present invention is to solve the problems of the existing target current monitoring devices, such as the inability to obtain the accurate actual beam intensity of a target in real time due to the use of electric wires to connect the ammeter, the problem of pulling the ammeter in the automatic target replacement and target storage processes, and the need to manually release the connection between the target and the ammeter in a radiation environment, which not only fails to achieve fully automatic operation, but also poses a radiation risk, and also results in low target replacement efficiency. Thus, the present invention provides a target current monitoring device for a boron neutron capture therapy system. The target current monitoring device for a boron neutron capture therapy system can be used for measuring the dark current of a target in a comprehensive environment such as boron neutron capture therapy, automatic target replacement and replacement of the moderator to adjust the beam, can read the current of the target in real time under full automation, and at the same time, can achieve automatic replacement, movement and storage of the target, and can achieve free and arbitrary adjustment of the position of the target within a beam shaping body during the replacement of the moderator to meet the needs of various positions.

The technical solution adopted by the present invention to achieve its inventive objective is as follows: a target current monitoring device for a boron neutron capture therapy system, including a beam current shaping body and a replaceable target part disposed inside a proton channel of the beam current shaping body, and further including an automatic conduction detection device independent of the target part, where the automatic conduction detection device includes a contact part and an external current monitoring apparatus electrically connected with the contact part, the contact part is disposed on a moving path of the target part, and the contact part forms a circuit with the external current monitoring apparatus after being in contact with the target part. For the target current monitoring device for a boron neutron capture therapy system, an automatic conduction detection device independent of a target part is disposed. The automatic conduction detection device includes a contact part and an external current monitoring apparatus. The contact part is disposed on a moving path of the target part. When the target part is mounted inside a proton channel, the target part forms a circuit with the external current monitoring apparatus after being in contact with the contact part. A target current is transmitted in real time through the contact part to the external current monitoring apparatus for display and reading. Since there is no hard-wired connection of electric wires between the external current monitoring apparatus and the target assembly, there is no need to manually release the connection between the target and external current monitoring apparatuses such as the ammeter in a radiation environment, and there is no problem of pulling external current monitoring apparatuses such as the ammeter in the target replacement and target storage processes. The current of the target can be read in real time under full automation, the automatic replacement, movement and storage of the target can be achieved, and free and arbitrary adjustment of the position of the target within a beam shaping body can be achieved during the replacement of the moderator to meet the needs of various positions.

Preferably, the contact part itself forms a conductive contact, or the contact part is provided with a conductive contact. In order to achieve a function of contact conduction, the contact part can be a conductor itself, or a conductive contact can be disposed on the contact part, and a circuit is formed by contacting the conductive contact with the target part.

Preferably, the contact part is a telescopic pressing sheet or a telescopic probe; or the contact part is a pressing sheet or a conductive pin or a conductive ring. The contact part can preferably be a telescopic pressing sheet, or a telescopic probe can be adopted for the contact part. The contact part can also be a pressing sheet without telescopic performance, a conductive pin without telescopic performance or a conductive ring without telescopic performance. There is no limitation on a structural shape of the contact part, and the contact part can be in any shape as long as it can contact the target part to form a circuit.

Preferably, the automatic conduction detection device further includes a telescopic assembly configured to drive the contact part to extend and contract, and the telescopic assembly is disposed inside the proton channel or disposed inside the beam shaping body. In order to enable the target part to contact the contact part to form a circuit in a mounting process, a channel is formed inside the proton channel or inside a beam channel, and a telescopic assembly is disposed inside the channel. The telescopic assembly drives the contact part to axially extend and contract, so as to ensure that the target part can achieve contact with the contact part to form a circuit when it extends into different positions inside the beam shaping body.

Preferably, when the contact part is in contact with the target part, the contact part, the target part, the telescopic assembly and the external current monitoring apparatus form a circuit. The telescopic assembly can be directly used as a conductor, and a circuit is formed through the contact part, the target part, the telescopic assembly and the external current monitoring apparatus to monitor the target current in real time.

Preferably, the contact part is in communication with the external current monitoring apparatus through a line, and when the contact part is in contact with the target part, the contact part, the target part, the line and the external current monitoring apparatus form a circuit. As another way, the telescopic assembly can be set as an insulator. At this time, communication between the contact part and the external current monitoring apparatus is achieved through a line, and a circuit can also be formed among the contact part, the target part, the line and the external current monitoring apparatus.

Preferably, the telescopic assembly includes a mechanical telescopic assembly and an electric telescopic assembly. The telescopic assembly can be a mechanical telescopic assembly or an electric telescopic assembly, as long as it can achieve a telescopic function.

Preferably, the mechanical telescopic assembly includes a telescopic socket part and a rebound part. As a preferred solution, the mechanical telescopic assembly adopts a telescopic socket part. In order to ensure that the telescopic assembly has a rebound function, a rebound part is disposed on the telescopic socket part to ensure that the contact part can automatically return to its original position in the target replacement process.

Preferably, the telescopic socket part at least includes an outer socket part and an inner socket part telescopically disposed inside the outer socket part. The telescopic socket part includes an outer socket part and an inner socket part. The outer socket part and the inner socket part can be an outer sleeve and an inner sleeve, or an outer rod and an inner sleeve rod. There is no limitation on the specific shape, and as long as internal and external telescoping can be achieved, the setting requirements of the telescopic assembly can be met.

Preferably, the rebound part is a tension spring or a tension elastic strip disposed inside the telescopic socket part. The rebound part can be a tension spring or a tension elastic strip, as long as it is a component that can achieve a rebound function.

Preferably, the mechanical telescopic assembly includes a built-in telescopic device. As another preferred solution, the mechanical telescopic assembly can also use a built-in telescopic device with a fixed or certain telescopic amount, which can also achieve the purpose of telescoping. The built-in telescopic device can have a fixed limit telescopic amount, and it can be telescoped within the range of this limit telescopic amount to meet the needs of monitoring a current of a target body at different positions.

Preferably, an inner wall of the proton channel is provided with a sliding groove, the built-in telescopic device is disposed inside the sliding groove, the contact part is connected to one end of the built-in telescopic device, and the other end of the built-in telescopic device is fixed on the sliding groove or fixed outside the beam shaping body. In order to mount the built-in telescopic device, a sliding groove can be formed on an inner wall of the proton channel, and the built-in telescopic device is disposed inside the sliding groove, and the contact part is driven to extend and contract by the built-in telescopic device.

Preferably, the built-in telescopic device is a telescopic spring or a telescopic elastic strip or a telescopic elastic tube. The built-in telescopic device can be a telescopic spring, a telescopic elastic strip or various elastic components such as a telescopic elastic tube.

Preferably, the electric telescopic assembly includes a power assembly and a connecting part, and the power assembly adopts an air cylinder or an oil cylinder having a fixed telescopic amount. The telescopic assembly can also be an electric telescopic assembly. The electric telescopic assembly mainly includes a power assembly and a connecting part. The connecting part is driven to extend and contract by the power assembly, so as to drive the contact part to inwards and outwards.

Preferably, the connecting part is disposed inside the proton channel or disposed inside a telescopic channel disposed on the beam shaping body parallel to the proton channel, and the connecting part is driven by the power assembly to perform telescopic movement inside the proton channel or inside the telescopic channel. The connecting part can be selected according to a specific mounting position. It can be disposed inside the proton channel, or a telescopic channel can be disposed on the beam shaping body, and the connecting part can be disposed inside the telescopic channel.

Preferably, the automatic conduction detection device further includes a connecting part having a fixed length, the connecting part is disposed inside the proton channel or disposed inside the beam shaping body, and the contact part is disposed at an end of the connecting part. In order to meet the need of monitoring a current of the target part with a fixed insertion length, the connecting part can be set to a fixed length. A length of the connecting part extending into the proton channel or inside the beam shaping body is fixed, that is, the contact part is fixed at a fixed position on the moving path of the target part. When the target part is inserted into the proton channel and reaches a position of the contact part, a circuit is formed by contact.

Preferably, when the contact part is in contact with the target part, the contact part, the target part, the connecting part and the external current monitoring apparatus form a circuit. The connecting part can be directly used as a conductor, and a circuit is formed through the contact part, the target part, the connecting part and the external current monitoring apparatus to monitor the target current in real time.

Preferably, the contact part is in communication with the external current monitoring apparatus through a line, and when the contact part is in contact with the target part, the contact part, the target part, the line and the external current monitoring apparatus form a circuit. As another way, the connecting part can be set as an insulator. At this time, communication between the contact part and the external current monitoring apparatus is achieved through a line, and a circuit can also be formed among the contact part, the target part, the line and the external current monitoring apparatus.

The beneficial effects of the present invention are as follows. (1) For the target current monitoring device for a boron neutron capture therapy system, since there is no hard-wired connection of electric wires between the automatic conduction detection device and the target assembly, there is no need to manually release the connection between the target and the ammeter in a radiation environment, and there is no problem of pulling the ammeter in the target replacement and target storage processes. The current of the target can be read in real time under full automation, the automatic replacement, movement and storage of the target can be achieved, and free and arbitrary adjustment of the position of the target within a beam shaping body can be achieved during the replacement of the moderator to meet the needs of various positions.

(2) The automatic conduction detection device mainly achieves axial extension and contraction through the contact part and the telescopic assembly, so as to contact target parts at different positions to form a circuit. The setting of the contact circuit can ensure that when the target part extends into different positions inside the beam shaping body, it can achieve contact with the contact part to form a circuit, and fully automatic target replacement can be achieved.

(3) The telescopic assembly can be mechanical or electric, with a wide range of applications and strong practicability. Moreover, the structure is simple. The telescopic assembly is disposed inside the beam shaping body, which can effectively prevent the leakage of the target current. The current monitoring device is disposed outside the beam shaping body or at a radiation-free position far away from the beam shaping body, with a long service life and convenient observation.

In the figures: 1. beam shaping body; 2. proton channel; 3. target part; 4. target body; 5. cylinder body; 6. automatic conduction detection device;

7. contact part; 71. rebound part;

8, conductive contact;

9. telescopic assembly; 91. telescopic socket part; 92. inner cavity; 93. outer socket part; 94. inner socket part; 95. sliding groove; 96. built-in telescopic device; 97. power assembly; 98. connecting part; 99. telescopic channel;

10. current monitoring device; 11. vacuum tube fitting; 12. positioning support; and 14. line.

DETAILED DESCRIPTION OF THE EMBODIMENTS

The various aspects of the present invention will be described in detail below through specific embodiments in conjunction with the drawings.

Figure 1:
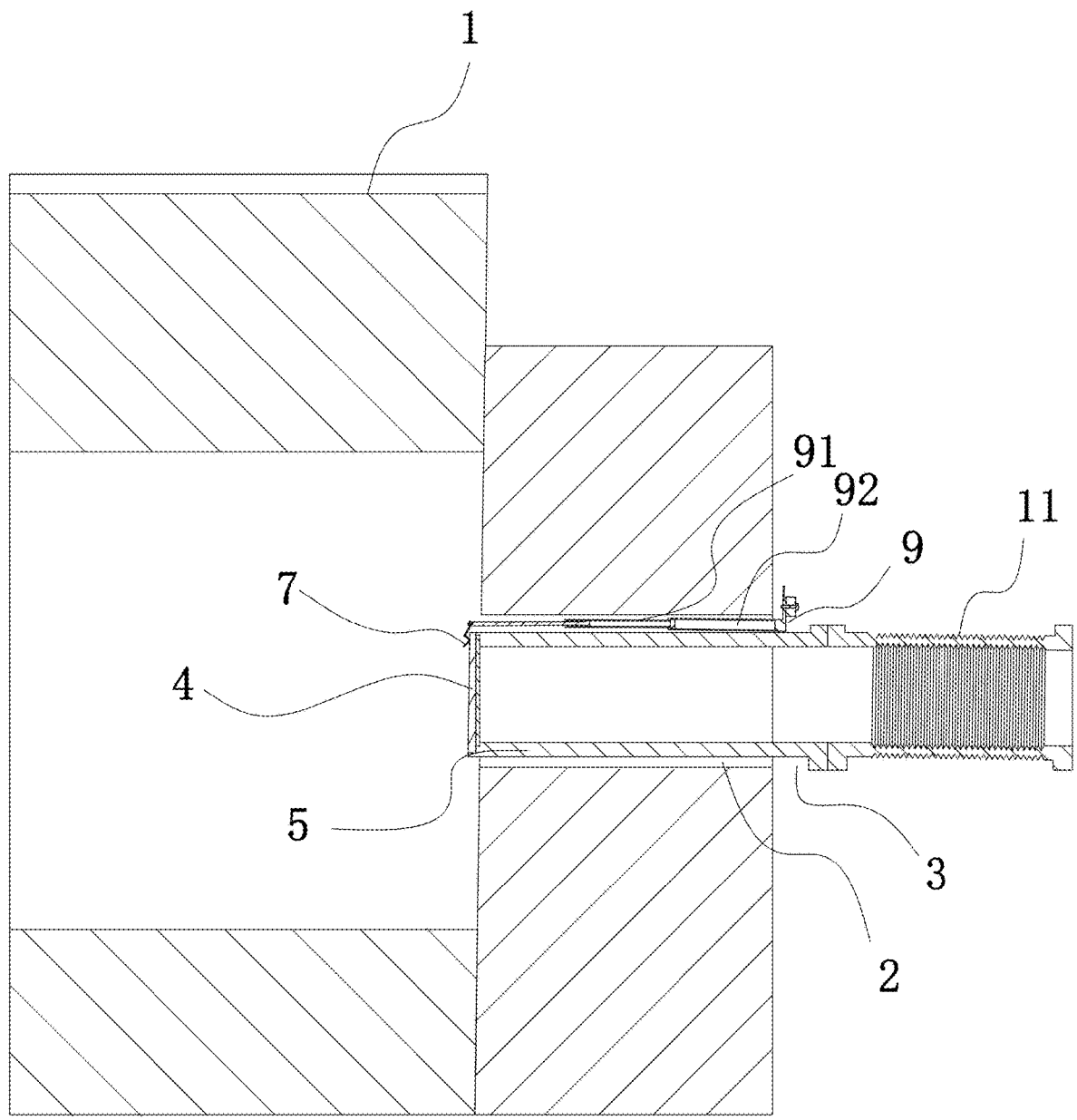
FIG. 1 is a schematic structural diagram of a target current monitoring device for a boron neutron capture therapy system in the present invention.
Figure 2:
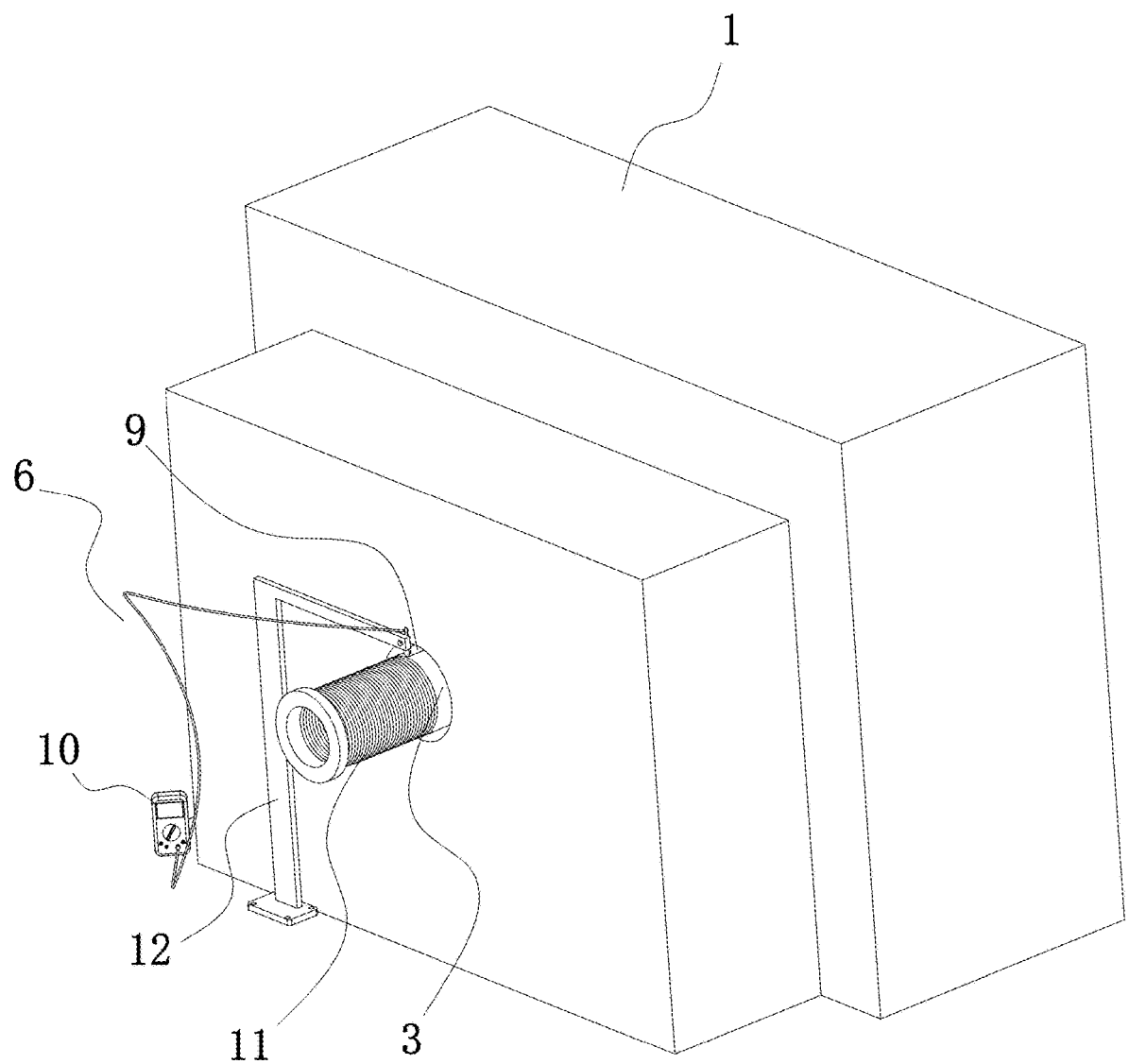
FIG. 2 is a schematic three-dimensional structural diagram of a target current monitoring device for a boron neutron capture therapy system in the present invention.
Figure 3:
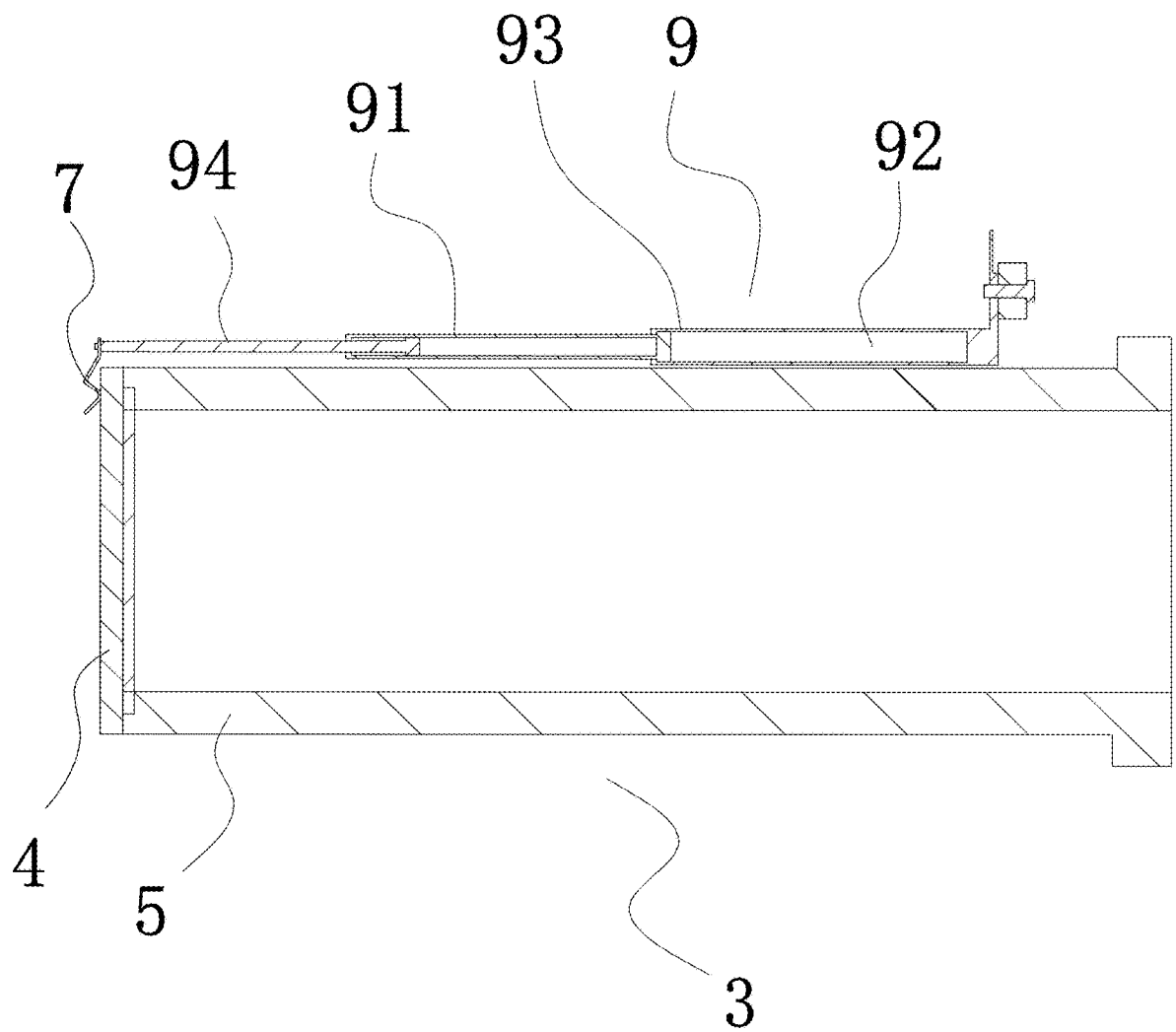
FIG. 3 is a schematic cross-sectional structural diagram of contact between an automatic conduction monitoring device and a target assembly in the present invention.

Embodiment 1 in the embodiments shown in FIG. 1, FIG. 2 and FIG. 3, a target current monitoring device for a boron neutron capture therapy system, including a beam shaping body 1 and a replaceable target part 3 disposed inside a proton channel 2 of the beam shaping body 1, and further including an automatic conduction detection device 6 independent of the target part 3, where the automatic conduction detection device 6 includes a contact part 7 and an external current monitoring apparatus 10, the contact part 7 is disposed on a moving path of the target part 3, and the contact part 7 forms a circuit with the external current monitoring apparatus 10 after being in contact with the target part 3.

In this embodiment, the contact part 7 itself forms a conductive contact. In other embodiments, the contact part 7 is provided with a conductive contact 8 (see FIG. 5).

The contact part 7 is a telescopic pressing sheet or a telescopic probe. In this embodiment, the contact part 7 is a telescopic pressing sheet.

Figure 4:
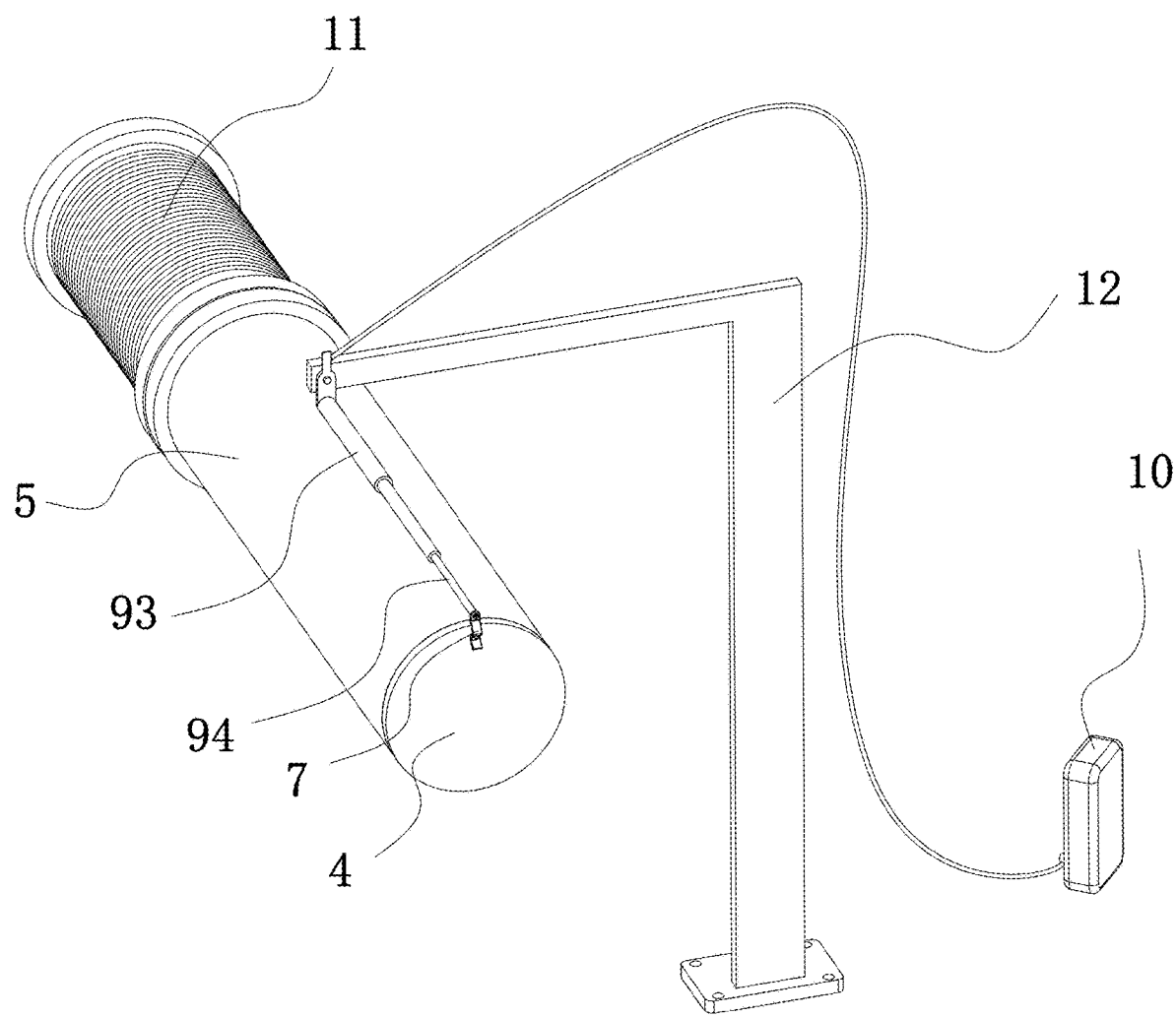
FIG. 4 is a schematic structural diagram of contact between an automatic conduction monitoring device and a target assembly in the present invention.

As shown in FIG. 4, the automatic conduction detection device 6 further includes a telescopic assembly 9 configured to drive the contact part 7 to extend and contract, and a current monitoring device 10 disposed outside the beam shaping body 1. The telescopic assembly 9 is disposed inside the proton channel 2 or disposed inside the beam shaping body 1. In this embodiment, the telescopic assembly 9 is disposed inside the proton channel 2.

The telescopic assembly 9 includes a mechanical telescopic assembly and an electric telescopic assembly. In this embodiment, the telescopic assembly 9 includes a mechanical telescopic assembly. The mechanical telescopic assembly includes a telescopic socket part 91 and a rebound part 71.

The telescopic socket part 91 at least includes an outer socket part 93 and an inner socket part 94 telescopically disposed inside the outer socket part 93. In this embodiment, the outer socket part is an outer sleeve, and the inner socket part is an inner sleeve. Of course, in other embodiments, the outer socket part and the inner socket part can also be an outer sleeve rod and an inner sleeve rod.

Figure 6:
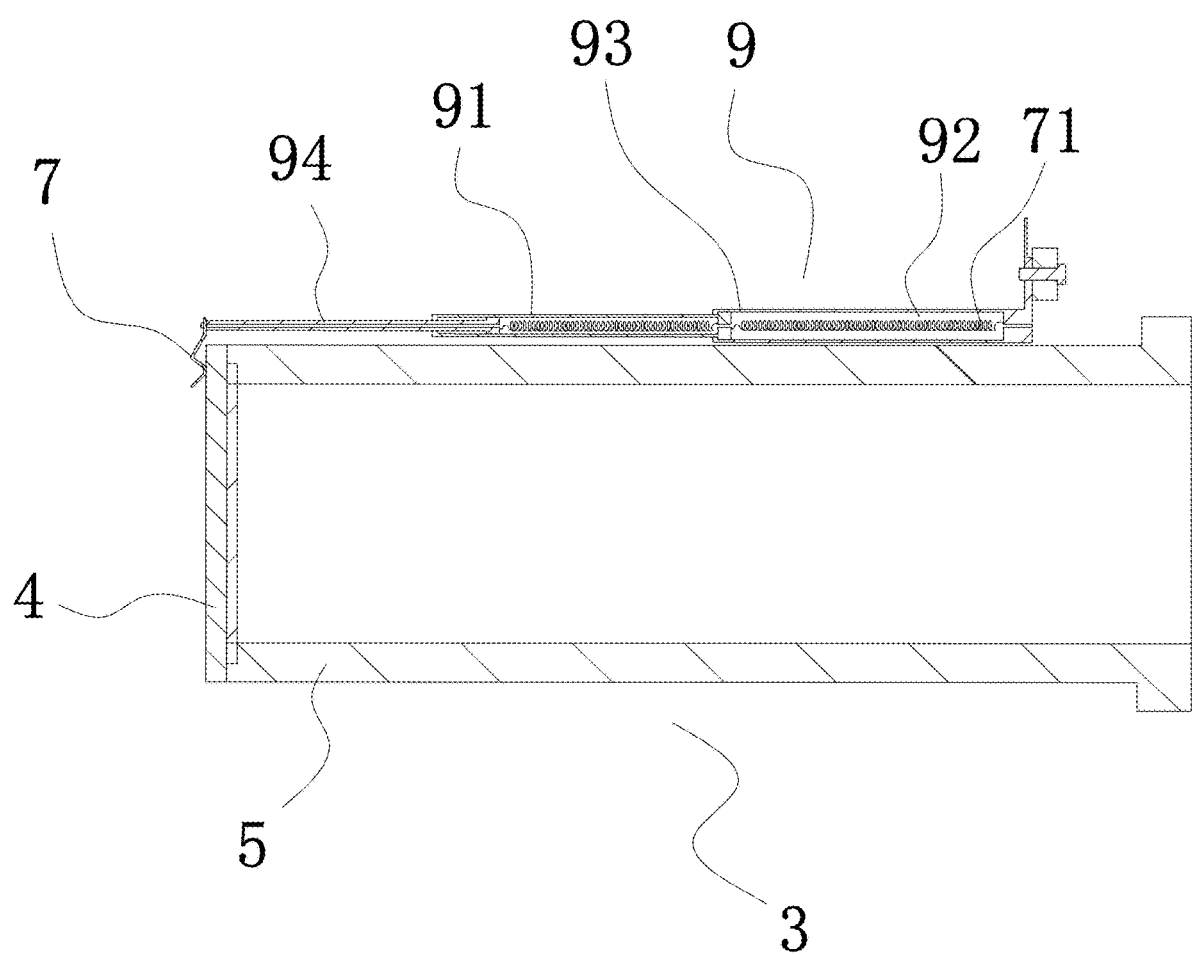
FIG. 6 is a third schematic cross-sectional structural diagram of contact between an automatic conduction monitoring device and a target assembly in the present invention.

As shown in FIG. 6, the rebound part 71 is a tension spring or a tension elastic strip disposed inside the telescopic socket part 91.

Figure 8:
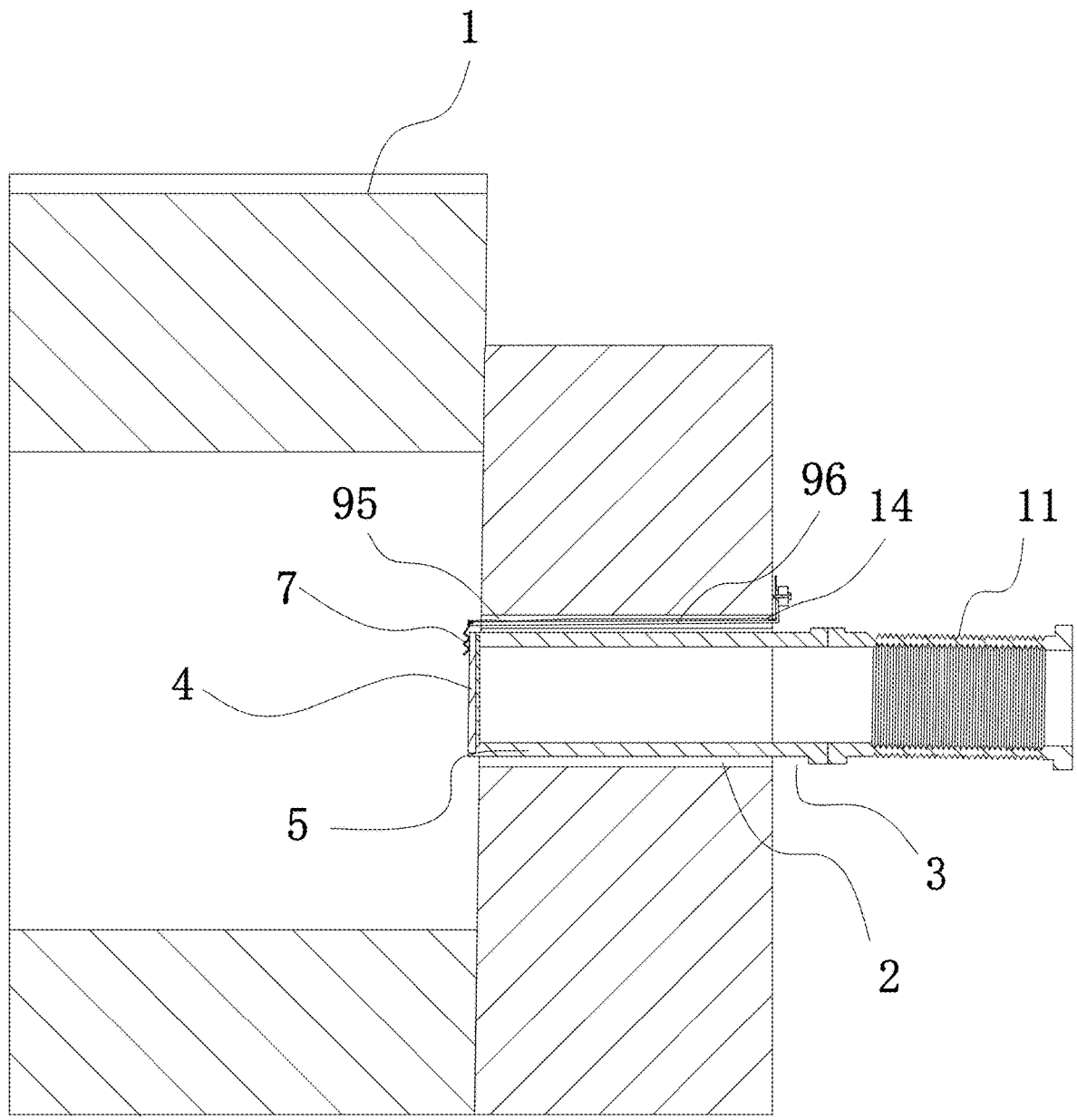
FIG. 8 is a second schematic structural diagram of a target current monitoring device for a boron neutron capture therapy system in the present invention.

In another embodiment, as shown in FIG. 8, the mechanical telescopic assembly includes a built-in telescopic device 96 having a fixed telescopic amount. An inner wall of the proton channel 2 is provided with a sliding groove 95, the built-in telescopic device 96 is disposed inside the sliding groove 95, the contact part 7 is connected to one end of the built-in telescopic device 96, and the other end of the built-in telescopic device 96 is fixed on the sliding groove 95 or fixed outside the beam shaping body 1. The built-in telescopic device 96 is a telescopic spring or a telescopic elastic strip or a telescopic elastic tube.

Figure 9:
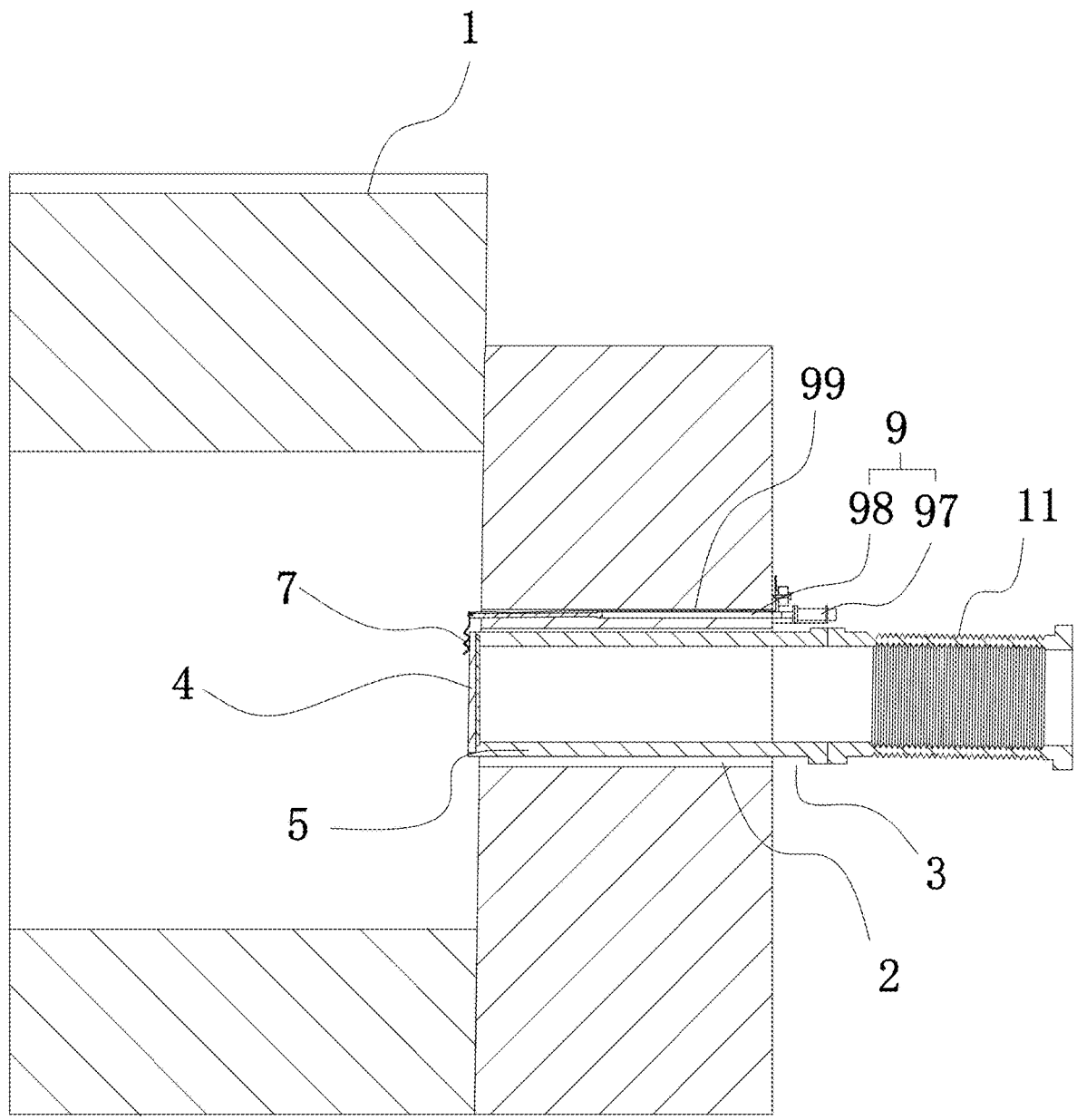
FIG. 9 is a third schematic structural diagram of a target current monitoring device for a boron neutron capture therapy system in the present invention.

In other embodiments, as shown in FIG. 9, the telescopic assembly 9 is an electric telescopic assembly. The electric telescopic assembly includes a power assembly 97 and a connecting part 98, and the power assembly 97 adopts an air cylinder or an oil cylinder having a fixed telescopic amount.

The connecting part 98 is disposed inside the proton channel 2 or disposed inside a telescopic channel 99 disposed on the beam shaping body parallel to the proton channel, and the connecting part 98 is driven by the power assembly 97 to perform telescopic movement inside the proton channel 2 or inside the telescopic channel 99.

In this embodiment, the telescopic assembly 9 can be used as a conductor, and when the contact part 7 is in contact with the target part 3, the contact part 7, the target part 3, the telescopic assembly 9 and the external current monitoring apparatus 10 form a circuit.

Figure 5:
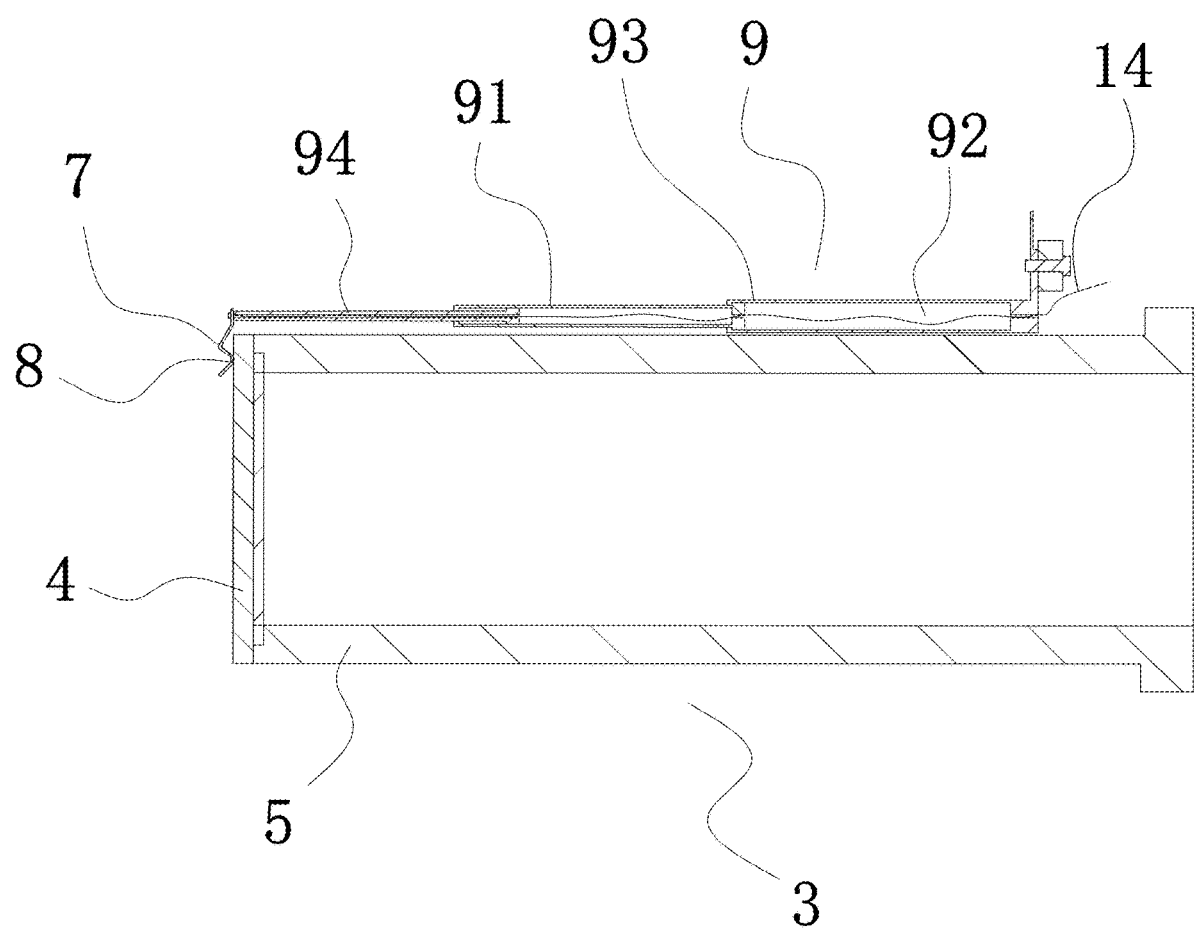
FIG. 5 is another schematic cross-sectional structural diagram of contact between an automatic conduction monitoring device and a target assembly in the present invention.
Figure 7:
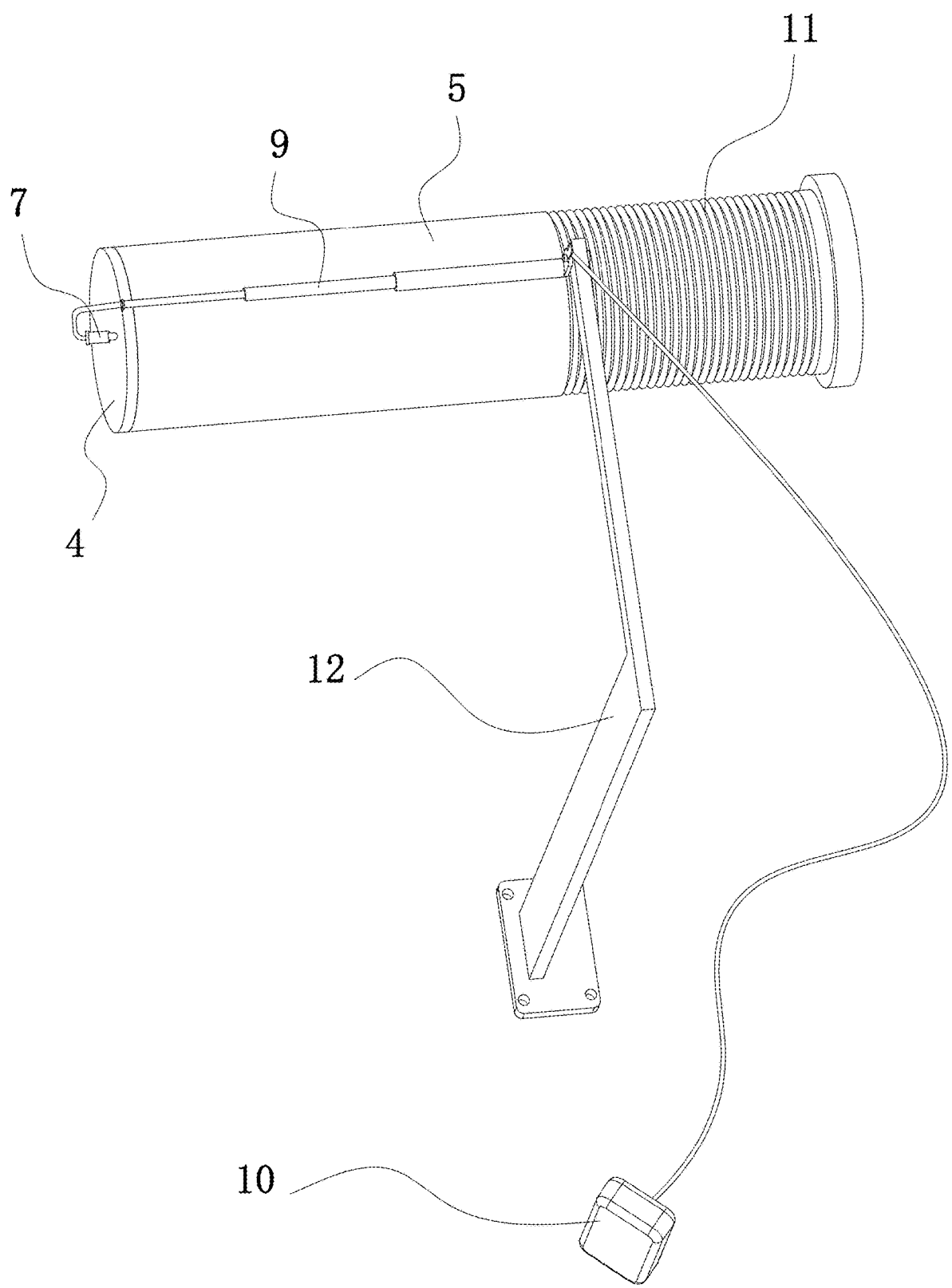
FIG. 7 is another schematic structural diagram of contact between an automatic conduction monitoring device and a target assembly in the present invention.

In other embodiments, as shown in FIG. 5, FIG. 7 and FIG. 8, the telescopic assembly 9 can be set as an insulator, the contact part 7 is in communication with the external current monitoring apparatus through a line 14, and when the contact part 7 is in contact with the target part 3, the contact part 7, the target part 3, the line 14 and the external current monitoring apparatus 10 form a circuit.

In other embodiments, the automatic conduction detection device further includes a connecting part 98 having a fixed length, the connecting part 98 is disposed inside the proton channel 2 or disposed inside the beam shaping body 1, and the contact part 7 is disposed at an end of the connecting part 98. By adopting the connecting part 98 with a fixed length to dispose the contact part 7 on the moving path of the target part 3, the setting of this connecting part with a fixed length can meet the need of current monitoring for the target part having a fixed extension length.

The connecting part 98 can be directly used as a conductor, and when the connecting part is a conductor, when the contact part 7 is in contact with the target part 3, the contact part 7, the target part 3, the connecting part 98 and the external current monitoring apparatus 10 form a circuit.

In another embodiment, the connecting part is set as an insulator. At this time, the contact part 7 is in communication with the external current monitoring apparatus 10 through a line 14. When the contact part 7 is in contact with the target part 3, the contact part 7, the target part 3, the line 14 and the external current monitoring apparatus 10 form a circuit.

Embodiment 2

In the embodiment shown in FIG. 7, a target current monitoring device for a boron neutron capture therapy system, including a beam shaping body 1 and a replaceable target part 3 disposed inside a proton channel 2 of the beam shaping body 1. The target part 3 includes a target body 4 and a cylinder body 5.

An automatic conduction detection device 6 independent of the target part 3 is disposed inside the proton channel 2. The automatic conduction detection device 6 can change a position of a circuit with movement of the target body 4 to achieve contact with the target body 4 to form a circuit. When the automatic conduction detection device 6 is out of contact with the target body 4, an open circuit is formed due to no contact.

The automatic conduction detection device 6 is provided with a contact part 7 for achieving contact with the target body 4 to form a circuit. The contact part 7 itself forms a conductive contact; or in another embodiment, the contact part 7 is provided with a conductive contact 8.

The contact part 7 is a telescopic pressing sheet or a telescopic probe. When the contact part 7 is a telescopic probe, the telescopic probe includes a needle tube, a spring and a needle tip. Alternatively, the telescopic probe includes a needle tube, a spring, a steel ball, a needle tip, or it can also be a needle tube, a spring, an inner tube and a needle tip, etc. The telescopic probe can be in various shapes such as a bent-tube type, an insertion-plate type, a flat-bottom type, a double-head type, a wire-bonding type, etc. The needle tip can be a sharp needle, a grabbing needle, a round-head needle, a knife-shaped needle, etc. The contact part can also be a pressing sheet without a telescopic function, a pressing sheet conductive pin without a telescopic function or a pressing sheet conductive ring without a telescopic function, etc.

In another embodiment, when the contact part 7 is a telescopic pressing sheet, the telescopic pressing sheet is integrally disposed in a multi-layer elastic bending structure. The telescopic pressing sheet is made of a conductive material, or the telescopic pressing sheet is made of a non-conductive material, and a conductive contact 8 is provided on the telescopic pressing sheet. The conductive contact 8 is in contact with the target body 4 to form a circuit. At this time, the conductive contact 8 is in communication with the external current monitoring apparatus through a line 14. The line 14 can be a conductive wire or an electric wire, and the conductive wire or the electric wire can be led out along a cavity wall of the proton channel 2 without being connected with the target part 3.

The automatic conduction detection device 6 can further include a telescopic assembly 9, a current monitoring device 10 disposed outside the beam shaping body 1, and a line 14 disposed inside the telescopic assembly 9. The line 14 is a conductive wire or an electric wire, and there is a contact part 7 for conducting electricity which is connected to the conductive wire or the electric wire.

The contact part 7 can be a telescopic probe or a telescopic pressing sheet, or a conductive contact disposed on the telescopic pressing sheet, or an annular conductor, etc., with various different structural shapes, and the specific shapes are different. As long as it can meet the setting of contact conduction, it is acceptable. Since the target body 4 is generally formed by a film on a circular copper plate, the contact part can adopt different structural shapes, as long as it can be in contact with the target body 4 to achieve conduction.

An inner end edge of the proton channel 2 of the beam shaping body is disposed with a contact part 7 for contact conduction. When a new target part 3 extends into the proton channel 2 of the beam shaping body, the contact part 7 will be elongated as the target part 3 extends, and it will always be in contact with the target body 4 in a tightly pressing manner. The contact part 7 is externally connected to the external current monitoring apparatus 10 such as an ammeter through a conductive wire or an electric wire, and can lead out the current in real time and transmit it to the external current monitoring apparatus 10 for reading. Since the conductive wire or the electric wire is connected to the contact part 7 and is not in hard-wired connection with the target part 3, the external current monitoring apparatus 10 such as an ammeter is not directly connected with the target part 3 to form a circuit. Instead, a circuit is formed only when the target part 3 is in contact with the contact part 7. Thus, the external current monitoring apparatus 10 and the target part 3 become two independent devices that do not interfere with each other, and a circuit can be formed only when they are in contact. This avoids a pulling influence on the external current monitoring apparatus 10 caused by the hard-wired connection of the electric wire when the target part 3 is replaced, or the problem of a radiation risk when people need to manually cut off the line in a radiation environment. At the same time, the operation of rapid and fully automatic target replacement can be achieved.

The telescopic assembly 9 can adopt mechanical telescoping or electric telescoping.

When the mechanical telescoping is adopted, the telescopic assembly 9 includes a telescopic socket part 91. The telescopic socket part 91 can be a telescopic sleeve or a telescopic sleeve rod. An inner cavity 92 is disposed inside the telescopic socket part 91 (see FIG. 5 and FIG. 6). The inner cavity 92 adopts an insulation setting, and the conductive wire or the electric wire is disposed inside the inner cavity 92 and extends and contracts together with the telescopic assembly 9. The contact part 7 is disposed at a telescopic end of the telescopic socket part 91, and the contact part 7 faces one end inside the beam shaping body 1.

In another embodiment, alternatively, the telescopic assembly 9 includes a telescopic socket part 91. The telescopic socket part 91 can be a telescopic sleeve or a telescopic sleeve rod. The telescopic sleeve or the telescopic sleeve rod is a conductor. The contact part 7 is disposed at a telescopic end of the telescopic socket part 91, and the contact part 7 faces one end inside the beam shaping body 1.

The telescopic socket part 91 at least includes an outer socket part 93 and an inner socket part 94 slidably and telescopically disposed inside the outer socket part 93. That is, the telescopic sleeve rod at least includes an outer sleeve and an inner sleeve slidably and telescopically disposed inside the outer sleeve. The telescopic sleeve rod at least includes an outer sleeve rod and an inner sleeve rod slidably and telescopically disposed inside the outer sleeve rod.

In order to ensure that the telescopic pressing sheet or the telescopic probe can automatically return to the original position, and at the same time, ensure that the telescopic pressing sheet or the telescopic probe can always effectively cling to the target body 4 in a contact conduction process to achieve a conduction function, the telescopic assembly 9 further includes a rebound part 71. The rebound part 71 can be a tension spring (see FIG. 6), or a tension elastic strip with strong resilience. The rebound part 71 can be disposed inside the telescopic sleeve or an inner cavity of the telescopic sleeve. One end of the rebound part is connected to an inner wall of the outer sleeve or the outer sleeve rod, and the other end is connected to a bottom of the inner sleeve or the inner sleeve rod.

When there is no need for contact conduction, that is, when the telescopic pressing sheet or the telescopic probe is not in contact with the target body 4, the tension spring is in a natural state. When the telescopic pressing sheet or the telescopic probe is in contact with the target body 4 for conduction, the tension spring is in a stretched state. Elastic force of the tension spring makes the telescopic pressing sheet or the telescopic probe cling to the target body 4 and be in a contact conduction state.

In another embodiment, the rebound part 71 can also be the elastic telescopic structure that the telescopic probe or the telescopic pressing sheet itself has, or it can be separately disposed and formed integrally through connection.

When there is no need for contact conduction, that is, when the telescopic pressing sheet or the telescopic probe is not in contact with the target body 4, the telescopic spring is in a natural state. When the telescopic pressing sheet or the telescopic probe is in contact with the target body 4 for conduction, the telescopic spring is in a stretched state. Stretching elastic force of the spring makes the telescopic pressing sheet or the telescopic probe cling to the target body 4 and be in a contact conduction state.

Through the setting of the rebound part 71, it is convenient for the operation of automatic target replacement, and it can also always keep the telescopic pressing sheet or the telescopic probe in a close contact conduction state with the target body 4 when adjusting a position of the target. A current can be effectively guided out in real time and detected through the external current monitoring apparatus 10.

In another embodiment, when the mechanical telescoping is adopted, the telescopic assembly 9 can also be achieved by setting a built-in telescopic device 96 having a fixed telescopic amount. Specifically, a sliding groove 95 can be formed on an inner wall of the proton channel 2, and the built-in telescopic device 96 is disposed inside the sliding groove. One end of the built-in telescopic device 96 is fixed inside the sliding groove or outside the beam shaping body, and the other end of the built-in telescopic device is connected with the contact part 7 and drives the contact part 7 to be movably and telescopically disposed inside the sliding groove 95. The setting of a telescopic amount is achieved by a sliding distance of the contact part 7 driven by the built-in telescopic device 96 inside the sliding groove. That is, by controlling a telescopic length of the built-in telescopic device 96, a sliding distance of the telescopic pressing sheet or the telescopic probe inside the sliding groove is controlled, so as to achieve a change of the telescopic amount, and thus meet the needs of current monitoring at different positions of the target.

One end of the contact part 7 is fixed on the built-in telescopic device 96, and the other end of the contact part 7 extends to the moving path of the target body and is electrically connected to the target body 4. The built-in telescopic device 96 can be a telescopic spring with an elastic function, or an elastic strip or an elastic tube. The moving path of the target body moves axially along the proton channel.

In another embodiment, when electric telescoping is adopted, the telescopic assembly 9 includes a power assembly 97 and a connecting part 98. The power assembly 97 can drive the connecting part 98 by adopting a servo motor, or can drive the connecting part 98 by adopting an air cylinder or an oil cylinder. Through extension and contraction of the power assembly, the purpose of extension and contraction of the telescopic pressing sheet or the telescopic probe can also be achieved.

A telescopic channel 99 is disposed parallel to the proton channel 2 on the beam shaping body 1, the connecting part 98 is disposed inside the telescopic channel 99, and the contact part 7 is connected with the connecting part 98 and is in contact with the target body 4 to form a circuit.

The automatic conduction detection device 6 further includes the external current monitoring apparatus 10 disposed at any position outside the beam shaping body 1. The external current monitoring apparatus 10 can be a milliammeter, an oscilloscope or any other apparatus that achieves a function of current monitoring and display.

The telescopic assembly 9 can be freely inserted inside the proton channel 2, or can be slidably disposed on the inner wall of the proton channel 2 through the sliding groove.

Cooling water is disposed inside the target body 4, and the cooling water is deionized water. The target body 4 is connected with the cylinder body 5 in an insulated state. At the same time, the target body 4 does not contact the beam shaping body 1, and the target body 4 is insulated everywhere. The target body 4 is disposed at one end of the cylinder body 5 extending into the beam shaping body 1. One end of the cylinder body 5 outside the beam shaping body 1 is fixedly or movably connected with a vacuum tube fitting 11. The vacuum tube fitting 11 and the cylinder body 5 can be connected by threads, can be fixedly welded, or can be connected in a flanged manner by disposing a flange on the cylinder body 5 and a flange on the vacuum tube fitting 11. Similarly, plug-in card type connection can also be adopted between the cylinder body 5 and the vacuum tube fitting 11, or the cylinder body and the vacuum tube fitting can be buckled through a male-female buckle structure, no matter which connection method is adopted, as long as it can meet the need of automatic target replacement as required and can achieve the vacuum connection with other external devices at the same time.

The target current monitoring device for a boron neutron capture therapy system is used for measuring the dark current of the target in a comprehensive environment such as boron neutron capture therapy, automatic target replacement and replacement of the moderator to adjust the beam. It can effectively monitor and read the current of the target part 3 in real time under full automation. At the same time, it is convenient for the automatic replacement and storage of the target part 3, and it is even more convenient for the operation of replacing the moderator and adjusting the position of the target part 3 at the beam shaping body.

The target part 3 is not directly in hard-wired connection with the external current monitoring apparatus 10 such as an ammeter by electric wires. This avoids pulling the ammeter due to the connection of the electric wires to the target part 3 and the ammeter each in the automatic target replacement and target storage processes, and also avoids the problems such as the need to manually release the connection between the target and the ammeter in a radiation environment, the existence of a radiation risk, and low operation efficiency.

Since the used contact part 7 (telescopic pressing sheet or telescopic probe) can change with the change of the position of the target body 4 inside the BSA and can always be in contact with the target body 4 for conduction, this monitoring device can meet the needs of current monitoring of the target body 4 at any position inside the beam shaping body 1, and has a wider range of applications. At the same time, when the target is replaced, the telescopic pressing sheet or the telescopic probe can automatically rebound to the initial position. Therefore, no matter how the position of the target part is adjusted during the replacement of the moderator, a circuit can be formed to lead the beam current to the external ammeter.

A contact circuit setting is adopted between the target 4 and the external current monitoring device 10 (milliammeter, oscilloscope, etc.), and the position of the target body 4 in the beam shaping body 1 can be moved arbitrarily as required. Since the automatic conduction detection device 6 and the target body 4 adopt contact for a circuit and non-contact for an open circuit, this can avoid affecting the external current monitoring apparatus in the target replacement process.

Since the position of the target body 4 inside the beam shaping body 1 is adjusted according to the treatment requirements, in order to ensure that the current from the accelerator to the target part can be led out through the ammeter under any treatment requirements, the telescopic probe or pressing sheet must have a large enough telescopic amount and be able to rebound autonomously. After the target part is transferred away during the replacement stage of the target part 3, the telescopic probe or the telescopic pressing sheet can return to the initial position to ensure that when the target part 3 extends into the beam shaping body, it can be in close contact with the telescopic probe or the telescopic pressing sheet from the very beginning. The rebound part 71 can also ensure more stable contact, good electrical conductivity and a good monitoring effect. When replacing the target part, there is no electric wire on the target part 3, so a reading device is not involved, and a new burden is not imposed on the storage of the target part 3. Moreover, when the position of the target part 3 is adjusted, the beam is not led out to cause leakage.

The target body 4 needs to be insulated from the cylinder body 5. At the same time, the target body 4 is not in contact with the beam shaping body 1, that is, the target body 4 is insulated everywhere. The water inside the target body is deionized water, which is also insulated. The telescopic pressing sheet or probe is also insulated from the outside world. Only when the telescopic pressing sheet is in contact with the target body can a circuit be formed. At the same time, the external current monitoring apparatus outside the beam shaping body and the telescopic pressing sheet or the telescopic probe form a circuit through electric wires or conductive wires.

The specific use process of the target current monitoring device for a boron neutron capture therapy system described in the above embodiments is as follows.

First, when the target part 3 extends into the proton channel 2 of the beam shaping body, the target body 4 is in contact with the contact part 7 at the initial position to form a circuit. As the target part 3 extends, the contact part 7 always remains in close contact with the target body, and conducts electricity with the target body 4 to form a circuit, which can monitor the target current in real time.

Second, the other end of the contact part 7, i.e. the end not in contact with the target body, is connected with the external current monitoring apparatus 10 such as an external ammeter through electric wires or conductive wires. When the target body 4 is in contact with the contact part 7, a circuit is formed among the target body 4, the contact part 7 and the external current monitoring apparatus 10 such as an ammeter, achieving real-time current monitoring.

Third, when replacing the target part 3, the target part 3 is separated from the beam shaping body 1, the target body 4 is disengaged from the contact part 7, and an open circuit is formed between the target body 4 and the external current monitoring apparatus 10 such as an ammeter. At this time, the target part 3 can be normally replaced and stored. The contact part 7 retracts to its original position by itself and remains inside the beam shaping body 1 without the need for replacement.

The contact part 7, i.e. the telescopic probe or the telescopic pressing sheet, is not limited to the rod-shaped or needle-shaped ones shown in the embodiments. As long as it can achieve contact conduction and automatic rebound, it can be regarded as an extension of this technology. For example, it can also be in a circular ring shape, etc.

In order to facilitate the setting of the telescopic assembly, a positioning support 12 is also provided. The positioning support 12 is not limited to the arrangement of a bracket outside the beam shaping body 1 shown in the figure. The positioning support 12 is not necessarily mounted outside, but can also be mounted on the beam shaping body 1, as long as the device is insulated from the accelerator and the beam shaping body.

In addition, after the beam is debugged and the position of the target part 3 is basically set, the automatic conduction detection device 6 can also be set to be non-telescopic or have a fixed telescopic amount. The rebound structure is mainly achieved by mechanical components such as springs, but it is not impossible to be completed by an electric mechanism. As long as it meets the rebound requirements, it should be regarded as an extension of this technology.

The external current monitoring apparatus 10 in the automatic conduction detection device 6 can be placed in a non-radiation area, thereby increasing the service life of the device.

The target current monitoring device for a boron neutron capture therapy system further includes a base, which can be configured to support the beam shaping body and place the external current monitoring apparatus 10, etc.

The target current monitoring device for a boron neutron capture therapy system, through the setting of the telescopic probe or the telescopic pressing sheet, i.e. the setting of the contact circuit mode, can achieve current monitoring of the target part at any position in the beam shaping body, with a wide range of applications and high practicality. Moreover, the monitoring device has a simple structure and a pure mechanical structure, which also ensures its radiation resistance and stability in a high-radiation environment, and reduces the operation cost.

The above specific implementations/embodiments are the descriptions of the embodiments specific to the present invention, which are used to illustrate the concept of the present invention. They are all explanatory and exemplary, and should not be construed as limitations on the implementations of the present invention and the scope of the present invention. In addition to the embodiments described herein, those skilled in the art can also adopt other obvious technical solutions based on the contents disclosed in the claims and the specification of this application. These technical solutions include technical solutions that make any obvious substitutions and modifications to the embodiments described herein, and are all within the scope of protection of the present invention.

What is claimed is:

1. A target current monitoring device for a boron neutron capture therapy system, comprising:
   a beam shaping body;
   a proton channel;
   a target part disposed inside the proton channel of the beam shaping body,
   wherein the target part is replaceable, and
   an automatic conduction detection device independent of the target part, the automatic conduction detection device comprises a contact part and an external current monitoring apparatus electrically connected with the contact part, the contact part is disposed on a moving path of the target part, and the contact part forms a circuit with the external current monitoring apparatus after being in contact with the target part;
   the automatic conduction detection device further comprises a line and a telescopic assembly configured to drive the contact part to extend and contract, and the telescopic assembly is disposed inside the proton channel or disposed inside the beam shaping body;
   the telescopic assembly is a conductor, and when the contact part is in contact with the target part, the contact part, the target part, the telescopic assembly, and the external current monitoring apparatus form the circuit; or
   the telescopic assembly is an insulator, the contact part is in communication with the external current monitoring apparatus through the line, and when the contact part is in contact with the target part, the contact part, the target part, the line, and the external current monitoring apparatus form the circuit.

2. The target current monitoring device for the boron neutron capture therapy system according to claim 1, wherein the contact part itself forms a conductive contact, or the contact part comprises a conductive contact.

3. The target current monitoring device for the boron neutron capture therapy system according to claim 2, wherein the automatic conduction detection device further comprises a connecting part having a fixed length, the connecting part is disposed inside the proton channel or disposed inside the beam shaping body, and the contact part is disposed at an end of the connecting part.

4. The target current monitoring device for the boron neutron capture therapy system according to claim 3, wherein when the contact part is in contact with the target part, the contact part, the target part, the connecting part, and the external current monitoring apparatus form the circuit.

5. The target current monitoring device for the boron neutron capture therapy system according to claim 3, wherein the contact part is in communication with the external current monitoring apparatus through the line, and when the contact part is in contact with the target part, the contact part, the target part, the line, and the external current monitoring apparatus form the circuit.

6. The target current monitoring device for the boron neutron capture therapy system according to claim 1, wherein the contact part is a telescopic probe, a pressing sheet, a conductive pin, or a conductive ring.

7. The target current monitoring device for the boron neutron capture therapy system according to claim 6, wherein the automatic conduction detection device further comprises a connecting part having a fixed length, the connecting part is disposed inside the proton channel or disposed inside the beam shaping body, and the contact part is disposed at an end of the connecting part.

8. The target current monitoring device for the boron neutron capture therapy system according to claim 7, wherein when the contact part is in contact with the target part, the contact part, the target part, the connecting part, and the external current monitoring apparatus form the circuit.

9. The target current monitoring device for the boron neutron capture therapy system according to claim 1, wherein the telescopic assembly comprises a mechanical telescopic assembly and an electric telescopic assembly.

10. The target current monitoring device for the boron neutron capture therapy system according to claim 9, wherein the mechanical telescopic assembly comprises a telescopic socket part and a rebound part.

11. The target current monitoring device for the boron neutron capture therapy system according to claim 10, wherein the telescopic socket part at least comprises an outer socket part and an inner socket part telescopically disposed inside the outer socket part.

12. The target current monitoring device for the boron neutron capture therapy system according to claim 10, wherein the rebound part is a tension spring or a tension elastic strip disposed inside the telescopic socket part.

13. The target current monitoring device for the boron neutron capture therapy system according to claim 9, wherein the mechanical telescopic assembly comprises a built-in telescopic device.

14. The target current monitoring device for the boron neutron capture therapy system according to claim 13, further comprising a sliding groove, wherein an inner wall of the proton channel is provided with the sliding groove, the built-in telescopic device is disposed inside the sliding groove, the contact part is connected to a first end of the built-in telescopic device, and a second end of the built-in telescopic device is fixed on the sliding groove or fixed outside the beam shaping body.

15. The target current monitoring device for the boron neutron capture therapy system according to claim 13, wherein the built-in telescopic device is a telescopic spring, a telescopic elastic strip, or a telescopic elastic tube.

16. The target current monitoring device for the boron neutron capture therapy system according to claim 9, wherein the electric telescopic assembly comprises a power assembly and a connecting part, and the power assembly comprises an air cylinder or an oil cylinder having a fixed telescopic amount.

17. The target current monitoring device for the boron neutron capture therapy system according to claim 16, further comprising a telescopic channel, wherein the connecting part is disposed inside the proton channel or disposed inside the telescopic channel disposed on the beam shaping body parallel to the proton channel, and the connecting part is driven by the power assembly to perform a telescopic movement inside the proton channel or inside the telescopic channel.

18. The target current monitoring device for the boron neutron capture therapy system according to claim 1, wherein the automatic conduction detection device further comprises a connecting part having a fixed length, the connecting part is disposed inside the proton channel or disposed inside the beam shaping body, and the contact part is disposed at an end of the connecting part.

19. The target current monitoring device for the boron neutron capture therapy system according to claim 18, wherein when the contact part is in contact with the target part, the contact part, the target part, the connecting part, and the external current monitoring apparatus form the circuit.

20. The target current monitoring device for the boron neutron capture therapy system according to claim 18, wherein the contact part is in communication with the external current monitoring apparatus through the line, and when the contact part is in contact with the target part, the contact part, the target part, the line, and the external current monitoring apparatus form the circuit.

\* \* \* \* \*